United States Patent Office 3,506,672
Patented Apr. 14, 1970

3,506,672
2-(4,4'-DIHALO)-BENZHYDRYL-3-QUINUCLIDINOLS
Edward John Warawa and Nancy Jean Mueller, Milwaukee, Wis., assignors to Aldrich Chemical Company, Inc., Milwaukee, Wis., a corporation of Wisconsin
No Drawing. Filed Mar. 29, 1968, Ser. No. 717,389
Int. Cl. C07d 29/02
U.S. Cl. 260—294.7    17 Claims

ABSTRACT OF THE DISCLOSURE

Compounds of the formula

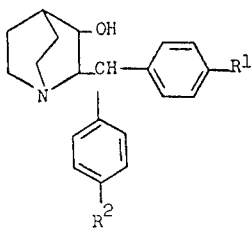

where $R^1$ and $R^2$ are both bromo or fluoro; and the pharmaceutically acceptable nontoxic salts thereof exhibit anti-inflammatory activity and are useful as anti-inflammatory agents in mammals.

BACKGROUND OF THE INVENTION

Field of the invention

This invention relates to novel nonsteroidal anti-inflammatory agents useful in treating arthritis, rheumatism and other inflammatory diseases in mammals. This invention also relates to compositions containing the novel anti-inflammatory agents and to a novel method of treating inflammatory diseases in mammals. In another aspect this invention relates to a method of preparing the novel compounds.

Description of the prior art

Presently available nonsteroidal anti-inflammatory agents characteristically cause stomach irritation and even ulceration. An object of the present invention is to provide novel, nonsteroidal anti-inflammatory agents having no serious side effects which would be of value, for example, in treating arthritis, rheumatism and other inflammatory diseases in mammals.

SUMMARY OF THE INVENTION

There is provided according to the present invention compounds of the formula

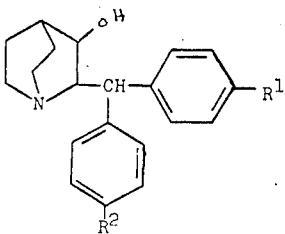

wherein $R^1$ and $R^2$ are both bromo or fluoro; and the pharmaceutically acceptable nontoxic salts thereof.

The quinuclidinol moiety (a) of the compounds described herein is represented throughout this specification as (b)

(a) 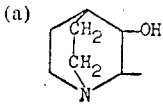   (b) 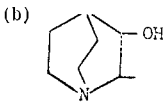

The pharmaceutically acceptable nontoxic salts include the organic and inorganic acid addition salts, e.g., those prepared from acids such as hydrochloric, sulfuric, sulfamic, tartaric, fumaric, hydrobromic, hydriodic, glycolic, citric, maleic, phosphoric, succinic, acetic, nitric and the like. Such salts are prepared by conventional methods.

A preferred embodiment of the present invention consists of compound of the formula

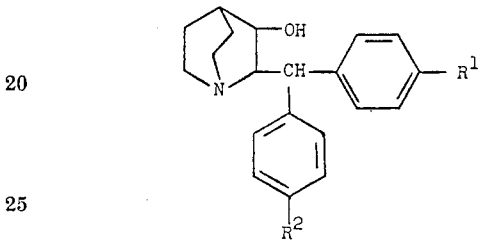

where $R^1$ and $R^2$ are fluoro, and the nontoxic salts thereof.

The compounds of this invention have more than one asymmetric center and can, therefore, be present in the form of a mixture of disastereoisomers, racemates or optically active antipodes. A mixture of disastereoisomers is separated as exemplified below into the individual racemic compounds on the basis of physico-chemical differences, such as solubility, for example by fractional crystallization. The racemates are resolved into the optical isomers according to known resolution procedures for examples by resolution with an optically active acid, e.g., mandelic acid by the procedure used on amines e.g., α-phenethylamine, amphetamine.

The compounds of this invention (Formula I) are prepared by reduction of a quinculidinone of the formula

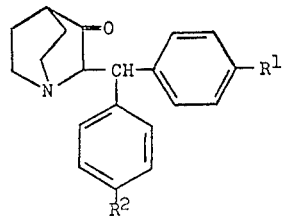

wherein $R^1$ and $R^2$ are as described above

Suitable methods for producing the compounds of Formula I are by reduction of the ketone of Formula III with lithium aluminum hydride, lithium borohydride in the presence of a nonreactive solvent, e.g., ether, tetrahydrofuran and the like, sodium borohydride in the presence of a nonreactive solvent e.g., methanol, ethanol, methylene chloride and the like, aluminum isopropoxide in the presence of a nonreactive solvent e.g., benzene, isopropylalcohol, toluene and the like (Meerwein-Ponndorf method), or catalytic hydrogenation in the presence of either platinum or Raney nickel catalyst.

To obtain the cis-isomer of the compounds of Formula I, preferably the ketone of Formula III is reduced with a aluminum isopropoxide in a nonreactive solvent, e.g., benzene, isopropylalcohol, or toluene but preferably isopropylalcohol. The reduction is preferably carried out above room temperature and preferably in the range of about 30 to 85° C., and in the most preferred procedure at reflux temperature.

To obtain the trans-isomer of the compounds of Formula I, preferably the ketone of Formula III is reduced with sodium borohydride in the presence of a nonreactive solvent e.g., methanol, ethanol, methylene chloride and the like but preferably a mixture of ethanol and methylene chloride. The reduction is preferably carried out below room temperature and preferably in the range of about 0° to 10° C.

When the individual optical isomers of the free bases of Formula I are converted to salts the salts have the opposite isomeric form i.e., when d-cis-2-(4,4'-difluoro)-benzhydryl-3-quinuclidinol is converted to its hydrochloride salt the l-cis-isomer is obtained and when l-cis-2-(4,4'-difluoro)-benzhydryl-3-quinuclidinol is converted to its hydrochloride salt the d-cis-isomer is obtained.

The compound of the Formula III as exemplified below are prepared by the following series of reactions.

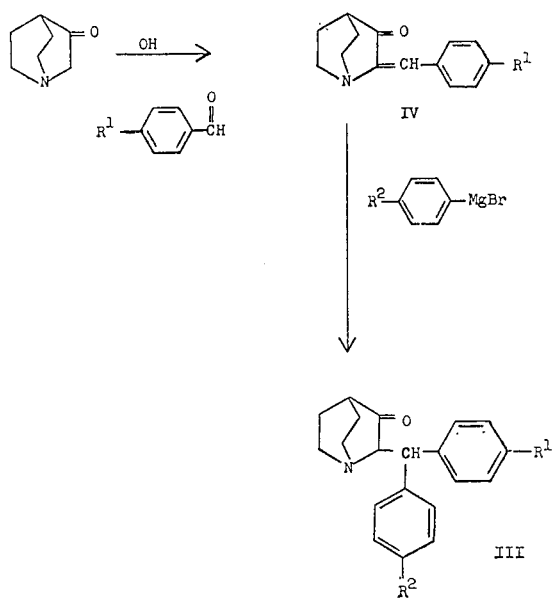

3-quinuclidinone is reacted according to the general procedure described by G. R. Clemo et al., J. Chem. Soc., 1939, 1241 and V. Braschler et al., Helv. Chim. Acta, 46, 2646 (1963) with substituted benzaldehyde in a solvent e.g., ethanol and in the presence of a base e.g., sodium hydroxide to produce a 2-benzylidenyl-3-quinuclidinone (IV). The 2-benzylidenyl-3-quinuclidinone (IV) is subjected to a Grignard reaction with substituted magnesium bromobenzene in a mixture of ether-benzene to yield a 2-benzhydryl-3-quinuclidinone (III).

The compounds of this invention have a high degree of anti-inflammatory activity, making them potent anti-inflammatory agents; and are useful in treating arthritis, rheumatism and other inflammatory diseases in mammals.

Anti-inflammatory tests of the compounds of the present invention were carried out on rats using the carrageenin-induced foot edema test of Charles A. Winter et al., Carrageenin-Induced Edema in Hind Paw of the Rat as an Assay for Anti-Inflammatory Drugs, Proceedings of the Society for Experimental Biology and Medicine, 111, 544 (1962). The compounds were given orally or intraperitoneally to the rat and one hour later carrageenin was injected subcutaneously into one paw. Three hours later the degree of edema was measured volumetrically by fluid displacement and compared to that of the control paw to give a result presented in terms of percentage inhibition of edema. Any result of more than 30% inhibition was greater than three times the standard deviation of the result in control animals and thus clearly indicated anti-inflammatory activity.

In the test described above a preferred compound of the present invention having the formula

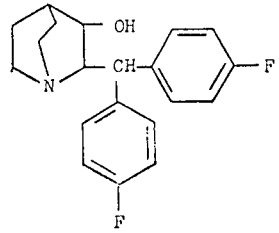

in the racemic cis-form and its enantiomers and in the racemic trans-form gave the following percentage inhibition of edema:

| Compound | Dose, mg./kg. | Percent inhibition I.P. | Percent inhibition P.O. |
|---|---|---|---|
| dl-Cis-2-(4,4'-difluoro)-benzhdydryl-3-quinuclidinol hydrochloride. | 32 | 49 | 56 |
|  | 16 |  | 47 |
|  | 8 | 46 | 33 |
|  | 2 | 31 |  |
| l-Cis-2-(4,4'-difluoro)-benzhydryl-3-quinuclidinol hydrochloride. | 32 | 65 | 64 |
|  | 16 |  | 65 |
|  | 8 | 52 | 46 |
|  | 2 | 29 |  |
| d-Cis-2-(4,4'-difluoro)-benzhydryl-3-quinuclidinol hydrochloride. | 32 | 35 |  |
|  | 16 |  |  |
|  | 8 | 32 |  |
|  | 2 | 23 |  |
| dl-Trans-2-(4,4'-difluoro)-benzhydryl-3-quinuclidinol hydrochloride. | 32 | 58 | 51 |
|  | 16 |  | 25 |
|  | 8 | 26 | 0 |
|  | 2 | 25 |  |

The lethal dose which killed fifty percent of the animals (mice) ($LD_{50}$) by the intraperitoneal route was approximately 70 mg./kg. for dl-cis-2-(4,4'-difluoro)benzhydryl-3-quinuclidinol and the d and l isomers and 110 mg./kg. for dl-trans-2-(4,4'-difluoro)benzhydryl-3-quinuclidinol.

When dl-cis-2-(4,4'-dibromo)-benzhydryl-3-quinuclidinol was used in the foregoing test the percentage inhibition of edema obtained at doses of 64 mg./kg. and 32 mg./kg. p.o. was 46% and 29% respectively. The $LD_{50}$ (i.p.) in mice was approximately 110 mg./kg.

There is no indication that the compounds of this invention cause gastro-intestinal irritation.

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. Some examples of the carriers which can be used are gelatin capsules, sugars, cellulose derivatives such as carboxymethylcellulose, gelatin, talc, magnesium stearate, vegetable oil such as peanut oil, etc., liquid petroleum, glycerin, sorbitol, ethanol, agar, elixirs, syrups and water including sterile water. The compositions may take the form of tablets, powders, granules, capsules, suspensions, solutions, and the like.

The compounds of this invention when administered orally or parenterally in an anti-inflammatory amount are effective in treating inflammatory diseases in mammals. An oral dosage range of about 1 to about 100 milligrams per kilogram per day is convenient which may be administered in divided dosage, e.g., two, three or four times a day. Administration of the compounds is conveniently begun at the minimal effective dose (MED) of the particular compound in the particular species of mammal. However, in general, the particular dosage most suitable for a particular application, as might be expected, will vary with the age, weight and general health of the mammal under treatment and the degree of anti-inflammatory effect required. After taking into consideration these factors and any other factors to be considered, one skilled in the art of treating diseases of mammals can readily determine the appropriate dosage.

The following examples are intended to illustrate the invention described herein.

EXAMPLE 1

3-quinuclidinone

Conversion of the hydrochloride to the free base.—Sodium methoxide was freshly prepared by reacting 14.00 g. (0.061 M) of sodium with 200 ml. of methanol. This was then rapidly added through a dropping funnel to a refluxing solution of 100 g. (0.062 M) of 3-quinuclidinone hydrochloride in 600 ml. of methanol. After the addition was completed, heating was discontinued and it was stirred for ten minutes followed by cooling with an ice bath. The sodium chloride was separated by suction filtration, and the filtrate was concentrated in vacuo using a warm water bath. The residue was treated with anhydrous ether and again concentrated in vacuo. Then anhydrous ether was again added followed by filtration to remove any additional sodium chloride. Concentration of the filtrate in vacuo gave 76.4 g. (98.5% of theory) of white solid which was stored in a dessicator under vacuum over $CaCl_2$.

EXAMPLE 2

Preparation of 2-(4-fluoro)-benzylidenyl-3-quinuclidinone

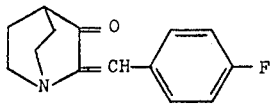

A solution of 3-quinuclidinone (12.50 g., 0.10 M), 12.40 g. (0.10 M) of p-fluorobenzaldehyde, 25 ml. of ethanol, and one pellet of sodium hydroxide was refluxed for 2.5 hours and then stirred at room temperature overnight. A yellow precipitate had formed which was collected, washed with a small amount of ethanol and then with water yielding 20.90 g. (90.5% of theory) which melted at 118.5–120.5° C.

EXAMPLE 3

Preparation of 2-(4,4'-difluoro)-benzhydryl-3-quinuclidinone

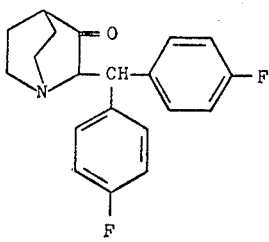

The Grignard reagent was prepared in the usual way using 175 g. (1.0 M) of 4-bromofluorobenzene in ca. 900 ml. of anhydrous ether, 26.7 g. (1.1 M) of magnesium turnings and a trace of iodine. While this solution was cooled with an ice bath, 151 g. (0.65 M) of 2-(4-fluoro)-benzylidenyl-3-quinuclidinone dissolved in 1900 ml. of benzene was added dropwise over a period of 6.5 hours. After the addition was complete, stirring was continued at ice bath temperature for one hour followed by stirring overnight at room temperature. While the reaction mixture was cooled with an ice bath, 50 ml. of water was added dropwise followed by stirring at room temperature for one hour. The magnesium salts were separated by suction filtration through Celite with thorough washing of the salts with tetrahydrofuran. After the filtrate was concentrated in vacuo, the residue was taken up in methylene chloride and dried over magnesium sulfate. Removal of the magnesium sulfate and methylene chloride left a yellow semi-solid which was crystallized from ethanol by dissolving it in ca. 1.8 l. of hot ethanol and then concentrating it to ca. 1 liter. Two crops of white solid were obtained: (1) 129.9 g., M.P. 162–164° C.; (2) 13.24 g., M.P. 160.0–162.5° C. Total yield: 143.1 g. (67.5% of theory).

EXAMPLE 4

Preparation of d,l-cis-2-(4,4'-difluoro)-benzhydryl-3-quinuclidinol

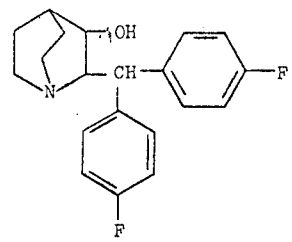

A solution of 120 g. (0.367 M) of 2-(4,4'-difluoro)-benzhydryl-3-quinuclidinone, 200 g. (0.98 M) of aluminum isopropoxide and one liter of anhydrous isopropanol was heated to reflux with a slow stream of $N_2$ passing through the reaction mixture. At the first sign of refluxing, the solution was homogeneous, but a few minutes later a white solid began to form and increased during the remainder of the reaction. Isopropanol was added occasionally to maintain volume and refluxing was continued until acetone was no longer detected in the distillate (tested for with DNP reagent). The total reflux time was four hours. Then the reaction mixture was concentrated in vacuo, leaving a white solid to which was added ca. 500 ml. of water and ca. 250 ml. of 50% NaOH. After stirring this mixture for ca. one hour with a mechanical stirrer, it was extracted with methylene chloride, the organic layers being combined and dried over $MgSO_4$. Removal of the $MgSO_4$ and $CH_2Cl_2$ left 118.1 g. (98% of theoretical) of a fluffy white solid, M.P. 196.5–197.5° C. Recrystallization from methanol (charcoal) (dissolved in ca. 2 liters of methanol and then concentrated to ca. one liter) yielded 3 crops of white solid: (1) 77.2 g., M.P. 198–199° C.; (2) 15.7 g., M.P. 198–198.5° C.; (3) 8.8 g., M.P. 197–198° C. The second and third crops were combined and recrystallized again from methanol (dissolved in ca. 650 ml. of methanol and then concentrated to ca. 300 ml.). There was obtained 20.96 g. of white solid melting at 197.5–198.0° C. A thin layer chromatography (TLC) analysis of the 77.2 g. and the 20.96 g. on micro alumina plates developed with $CH_2Cl_2$ ($I_2$ detected) showed only one spot in each case. A 1.00 g. sample of the 77.2 g. was dried on the Abderhalden after which the melting point was unchanged.

EXAMPLE 5 d,l-Cis-2-(4,4'-difluoro)benzhydryl-3-quinuclidinol hydrochloride

Cis-2-(4,4'-difluoro)benzhydryl-3-quinuclidinol (1.0 g.) was dissolved in about 175 ml. of anhydrous ether. When HCl was passed through the solution, a white precipitate formed which was collected by suction filtration and dried, giving 1.02 g., M.P. 298° C. (dec.). Recrystallization from ethanolether gave 0.98 g. of white plate crystals, M.P. 297–300° C. (dec.). After drying the sample over refluxing methanol in an Abderhalden, the melting point was 295° C. (dec.).

Note: (1) A Mel-Temp melting point apparatus was used.

EXAMPLE 6 d,l-Cis-2-(4,4'-difluoro)benzhydryl-3-quinuclidinol

A resolution was performed starting with 2.00 g. of d,l-cis - 2 - (4,4'-difluoro)benzhydryl-3-quinuclidinol and 0.924 g. of d- and l-mandelic acids respectively. Each salt was made in acetone and fractionally crystallized from the same solvent.

| Crop | Salt M.P. °C. (dec.) | Salt Rotation (MeOH) (deg.) | Base M.P. °C. | Base Rotation (CHCl₃) (deg.) |
|---|---|---|---|---|
| (l) Mandelic acid: | | | | |
| 1 | 220–222 | −28 | 182–187 | +6.18 |
| 2 | 222.5–227.5 | −29.1 | ¹ 183–235 | +9.68 |
| 3 | 226–228 | −27.1 | 185–187 | +11.05 |
| 4 | 228–230 | −30.3 | 184–185 | +9.08 |
| (d) Mandelic acid: | | | | |
| 1 | 215–218 | +28 | 198–199 | 0 |
| 2 | 223–228 | +30 | ¹ 181–183 | −7 |
| 3 | 230–232 | +27 | 184–186 | −10.7 |
| 4 | 228–229 | +26.3 | 185–186 | −13.5 |

¹ Cloudy.

The free base obtained from the 4th crop in each case was recrystallized from methanol giving 166 mg. (16.6% yield) d-cis-2-(4,4'-difluoro)benzhydryl - 3-quinuclidinol, M.P. 185–186° C., +20° (C.=1, methanol) and 99 mg. (9.9% yield), l-cis-2-(4,4'-difluoro)-benzhydryl-3-quinuclidinol, M.P. 185–186° C., −20° (C.=1, methanol).

Treatment of d-cis-2-(4,4'-difluoro)benzhydryl-3-quinuclidinol with HCl produced l-cis-2-(4,4'-difluoro)benzhydryl-3-quinuclidinol hydrochloride [α]$_D^{25}$ −27° (C.=1, 0.06 N HCl) and treatment of l-cis-2-(4,4'-difluoro)benzhydryl-3-quinuclidinol with HCl produced l-cis-2-(4,4'-difluoro)benzhydryl-3-quinuclidinol hydrochloride [α]$_D^{25}$ +27° (C.=1, 0.06 N HCl).

EXAMPLE 7 d,l-Trans-2-(4,4'-difluoro)benzhydryl-3-quinuclidinol

While a solution of 5.00 g. (0.0153 M) of 2-(4,4'-difluoro)benzhydryl-3-quinuclidinone in ca. 175 ml. of ethanol and 25 ml. of methylene chloride was cooled with an ice bath, 1.16 g. (0.0306 M) of sodium borohydride was added portion-wise over a period of ten minutes. After the addition was complete, the reaction mixture was stirred at ice bath temperature for 0.5 hr. and then stirred at room temperature for 0.5 hr. followed by removal of the solvents in vacuo leaving a solid white residue. To the residue was added water and a small amount of ammonium hydroxide followed by suction filtration to collect the white precipitate. The white solid was dissolved in methylene chloride and dried over MgSO₄. Removal of the drying agent and solvent left 5.31 g. of a white solid. Thin layer chromatography (TLC) (micro alumina plate; ether; I₂) showed the crude solid to consist of a mixture of the cis and trans isomers with none of the starting ketone. The mixture of alcohols was dissolved in 45 ml. of warm sodium-dry benzene and added rapidly through a dropping funnel to a mixture of 11.56 g. (0.0635 M) of benzophenone, 1.42 g. (0.0354 M) of potassium hydride, and 35 ml. of sodium-dry benzene. The reaction mixture was refluxed for 0.75 hr. and then cooled with an ice bath. A small amount of ethanol was cautiously added and when there was no longer any visible reaction, water was added followed by concentration in vacuo. To the residue was added 2 N HCl followed by extraction with ether. The ether layer was washed once with water and the combined aqueous layers were washed once with ether. The aqueous layer was made alkaline with 50% sodium hydroxide and was extracted with methylene chloride. After drying the organic layer over MgSO₄, it was concentrated in vacuo leaving 4.69 g. of a yellow solid. This crude product, a mixture of trans-2-(4,4'-difluoro) benzhydryl-3-quinuclidinol and 2-(4,4'-difluoro)benzhydryl-3-quinuclidinone by TLC, was again reduced using 1.16 g. (0.0306 M) of sodium borohydride and worked up as described above to give 4.47 g. of a mixture of cis and trans-alcohols. The cis-alcohol was oxidized as described above using 12.20 g. (0.0671 M) of benzophenone, 1.20 g. (0.0299 M) of potassium hydride, and 70 ml. of sodium-dry benzene giving 4.20 g. of a mixture of the trans alcohol and the ketone. This mixture was reduced as described above using 1.0 g. (0.0291 M) of sodium borohydride and worked up as described above giving 3.94 g. of a mixture of the cis and trans alcohols. The crude product was oxidized using 1.06 g. (0.0265 M) of potassium hydride, 6.60 g. (0.0362 M) of benzophenone, and 60 ml. of sodium-dry benzene. The work up as described above gave 3.42 g. of a mixture of the trans alcohol and ketone. The ketone was separated from the alcohol by chromatography using 100 g. of neutral alumina. The ketone was removed by elution with 50% benzene-petroleum ether giving 1.01 g. of crude ketone followed by 0.32 g. of a mixture of the ketone and alcohol. The alcohol was obtained by elution with benzene, then 10% ether-benzene and finally with ether giving 1.85 g. of crude yellow solid. Recrystallization from cyclohexane gave 0.85 g., of the trans isomer M.P. 190–192° C. The analytical sample was prepared by drying this material in a Drying Pistol over refluxing methanol.

Analysis.—Cal'd for C₂₀H₂₁F₂NO (329.36) (percent): C, 72.92; H, 6.42; N, 4.26. Found (percent): C, 73.29; H, 6.40; N, 4.08.

EXAMPLE 8

When in the procedure of Example 6 d,l-cis-2-(4,4'-difluoro)benzhydryl-3-quinuclidinol is replaced by an equal molar amount of d,l-trans-2-(4,4'-difluoro)benzhydryl-3-quinuclidinol there are obtained d-trans-2-(4,4'-difluoro)benzhydryl-3-quinuclidinol and l-trans-2-(4,4'-difluoro)benzhydryl-3-quinuclidinol.

EXAMPLE 9

Preparation of d,l-cis-2-(4,4'-dibromo)-benzhydryl-3-quinuclidinol

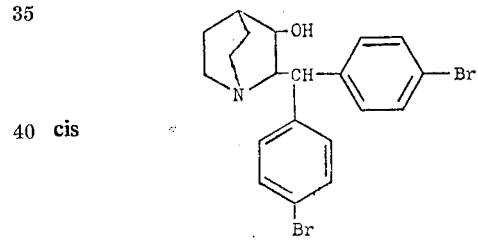

cis (A) 2-(4-bromo)benzylidene - 3 - quinuclidinone.—A solution of 7.10 g. (0.0566 M) of 3-quinuclidinone, 10.48 g. (0.0566 M) of 4-bromobenzaldehyde, 30 ml. of ethanol, and two pellets of NaOH was refluxed for 3.5 hrs. Upon cooling a yellow precipitate formed which was collected by suction filtration, washed with ethanol and then water, and dried giving 13.96 (84.5%) of yellow solid melting 125–126° C. The analytical sample was prepared by recrystallizing 2.00 g. from about 10 ml. of ethanol to yield 1.76 g. of a yellow solid, M.P. 125–126° C. Drying in an Abderhalden over refluxing methanol did not change the melting point.

Analysis.—Calc'd for C₁₄H₁₄BrNO (292.18) (percent): C, 57.55; H, 4.83; N, 4.80; Br, 27.35. Found (percent): C, 57.37; H, 4.90; N, 4.59; Br, 27.25.

(B) 2 - (4,4'-dibromo)benzhydryl-3-quinuclidinone.— The Grignard reagent was prepared in the usual way, using 7.25 g. (0.0307 M) of p-dibromobenzene in 100 ml. of anhydrous ether, 0.82 g. (0.0338 M) of magnesium turnings, a trace of iodine and a few drops of 1,2-dibromoethane to initiate the reaction. After refluxing for 2.75 hrs. the reaction mixture was cooled with an ice bath while 6.00 g. (0.0205 M) of 2-(4-bromo)benzylidene-3-quinuclidinone dissolved in 200 ml. of benzene was added dropwise over a period of 2.5 hrs. After stirring at room temperature overnight, a few ml. of water were added dropwise after which it was stirred at room temperature for 0.5 hr. Then the reaction mixture was filtered through Celite, the magnesium salts being thoroughly washed with tetrahydrofuran. Concentration of the filtrate in vacuo left a yellow liquid residue which was taken up in methylene chloride and dried over MgSO$_4$. Removal of the MgSO$_4$ and methylene chloride left 10.1 g. of taffy-like material which crystallized upon trituration with ethanol giving two crops of light yellow solid: (1) 3.72 g., M.P. 186–188° C. cloudy; (2) 0.08 g., M.P. 182–189° C. Recrystallization of the first crop from ethanol (charcoal) gave two crops of light yellow solid: (1) 2.94 g., M.P. 191–193° C.; (2) 0.21 g., M.P. 183–189° C. The total yield was 32%. The analytical sample was prepared by drying the first crop in an Abderhalden at room temperature overnight after which the melting point was 191.0–192.5° C.

*Analysis.*—Cal'd for C$_{20}$H$_{19}$Br$_2$NO (449.19) (percent): C, 53.48; H, 4.26; N, 3.12; Br, 35.59. Found (percent): C, 53.78; H, 4.32; N, 3.04; Br, 34.6 (yielded much soot).

(C) *d,l*-cis-2-(4,4'-Dibromo)benzhydryl - 3-quinuclidinol.—A solution of 1.50 g. (0.00334 M) of 2-(4,4'-dibromo)-benzhydryl-3-quinuclidinone, 2.00 g. (0.0098 M) of aluminum isopropoxide, and 25 ml. of anhydrous isopropanol was heated on a steam bath for 1.5 hrs. with nitrogen being passed through the reaction mixture to assist the distillation of acetone (detected with DNP reagent). The cooled reaction mixture was concentrated in vacuo leaving a white solid residue to which was added water and excess 50% NaOH followed by extraction with methylene chloride. After the organic layer was washed once with a saturated NaCl solution, it was dried over MgSO$_4$. Removal of the drying agent and solvent left 1.7 g. of crude white solid, M.P. 173.5–185 C. Recrystallization from methanol (charcoal) gave a first crop of 0.78 g., M.P. 205–206° C. and a second crop of 0.25 g., M.P. 205–206. The total yield was 1.03 g. (68.3%). A thin layer chromatography using a micro alumina plate developed with anhydrous ether (I$_2$ detected) showed only one spot with identical R$_f$ values for each crop. The first crop was used as the analytical sample.

*Analysis.*—Calc'd for C$_{20}$H$_{21}$BrNO (451.21 (percent): C, 53.24; H, 4.69; N, 3.11. Found (percent): C, 53.11; H, 4.91; N, 2.90

EXAMPLE 10

When in the procedure of Example 6 *d,l*-cis-2-(4,4'-difluoro)benzhydryl-3-quinuclidinol is replaced by an equal molar amount of *d,l*-cis-2-(4,4'-dibromo)benzhydryl-3-quinuclidinol there are obtained *d*-cis-2-(4,4'-dibromo)-benzhydryl-3-quinuclidinol and *l*-cis-2 - (4,4'-dibromo)-benzhydryl-3-quinuclidinol.

EXAMPLE 11

When in the procedure of Example 7, 2-(4,4'-difluoro-benzhydryl-3-quinuclidinone is replaced by an equal molar amount of 2-(4,4'-dibromo)benzhydryl-3-quinuclidinone there is obtained *d,l*-trans-2-(4,4'-dibromo)benzhydryl-3-quinuclidinol.

EXAMPLE 12

When in the procedure of Example 6 *d,l*-cis-2-(4,4'-difluoro)benzhydryl-3-quinuclidinol is replaced by an equal molar amount of *d,l*-trans-2-(4,4'-dibromo)benzhydryl-3-quinuclidinol there are obtained *d*-trans-2-(4,4'-dibromo) - benzhydryl-3-quinuclidinol and *l*-trans-2-(4,4'-dibromo)-benzhydryl-3-quinuclidinol.

While this invention has been described and exemplified in terms of its preferred embodiment, those skilled in the art will appreciate that modifications can be made.

We claim:

1. A compound selected from the group consisting of compounds of the formula

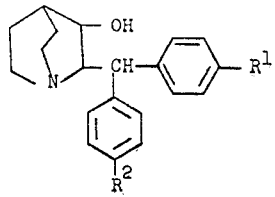

wherein R$^1$ and R$^2$ are both a member selected from the group consisting of bromo and fluoro; and the pharmaceutically acceptable nontoxic salts thereof.

2. The compound of claim 1 having the formula

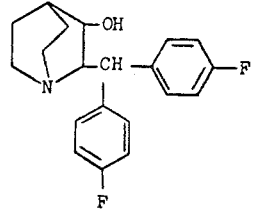

3. The compound of claim 11 having the formula

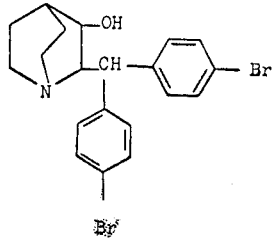

4. The cis-isomer of the compound of claim 2.
5. The dextrorotatory optical isomer of the compound of claim 4.
6. The trans-isomer of the compound of claim 2.
7. The dextrorotatory optical isomer of the compound of claim 6.
8. The cis-isomer of the compound of claim 3.
9. The dextrorotatory optical isomer of the compound of claim 8.
10. The trans-isomer of the compound of claim 3.
11. The dextrorotatory optical isomer of the compound of claim 10.
12. A pharmaceutically acceptable nontoxic salt of the compound of claim 2.
13. The hydrochloride salt of the compound of claim 2.
14. A pharmaceutically acceptable nontoxic salt of the compound of claim 4.
15. The hydrochloride salt of the compound of claim 4.
16. A pharmaceutically acceptable nontoxic salt of the compound of claim 5.
17. The hydrochloride salt of the compound of claim 5, said salt being *l*-cis-2-(4,4'-difluoro)benzhydryl-3-quinuclidinol hydrochloride.

References Cited

UNITED STATES PATENTS 2,917,515   12/1959   Grob.

HENRY R. JILES, Primary Examiner

S. D. WINTERS, Assistant Examiner

U.S. Cl. X.R.

260—294; 424—267

PO-1050
(5/69)

UNITED STATES PATENT OFFICE
CERTIFICATE OF CORRECTION

Patent No. 3,506,672      Dated April 14, 1970

Inventor(s) Edward John Warawa and Nancy Jean Mueller

It is certified that error appears in the above-identified patent and that said Letters Patent are hereby corrected as shown below:

In claim 3, the wording should read:

"The compound of claim 1 having the formula".

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents